April 8, 1969
D. E. KIFER
3,436,880
COUNTER FLASHING
Filed Feb. 21, 1967
Sheet 1 of 2
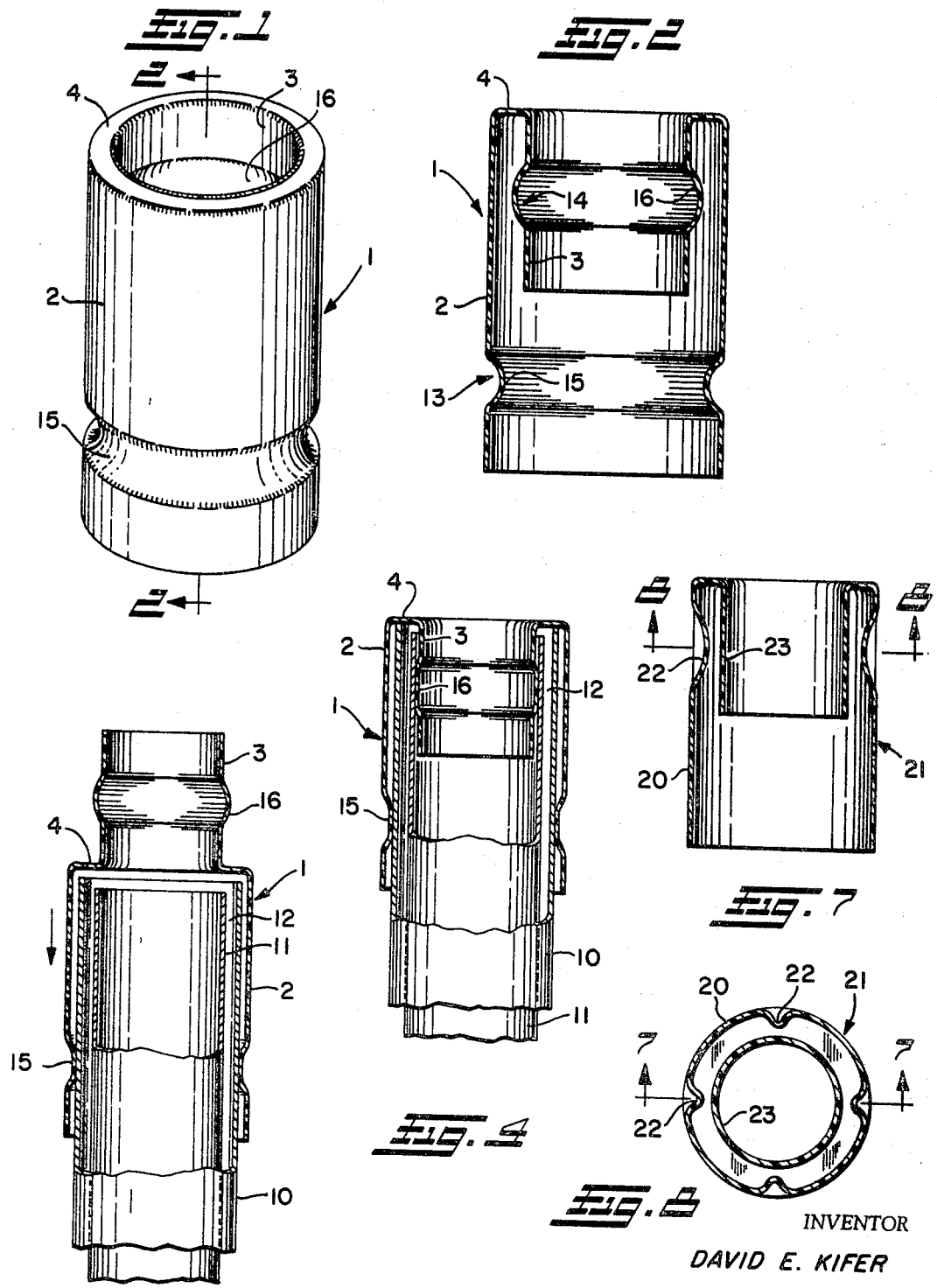
INVENTOR
DAVID E. KIFER
BY Oberlin, Maky & Donnelly
ATTORNEYS April 8, 1969 — D. E. KIFER — 3,436,880
COUNTER FLASHING
Filed Feb. 21, 1967
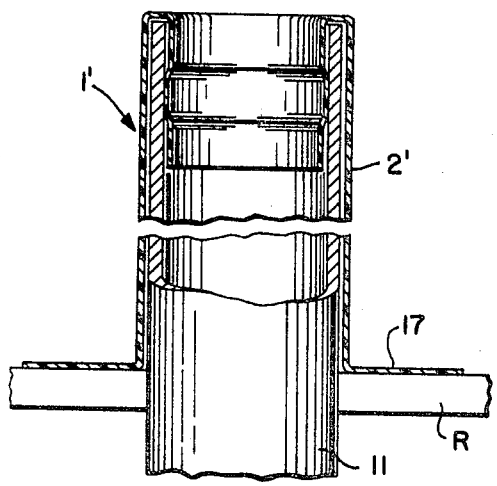
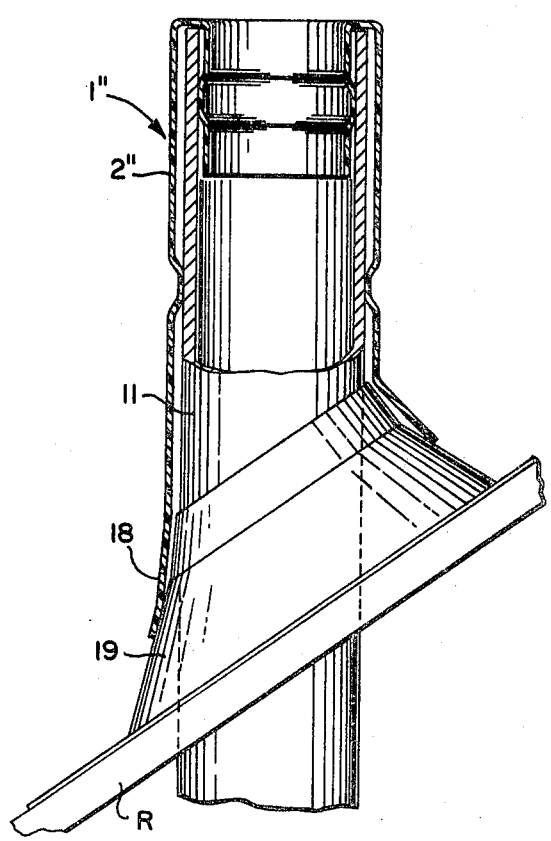
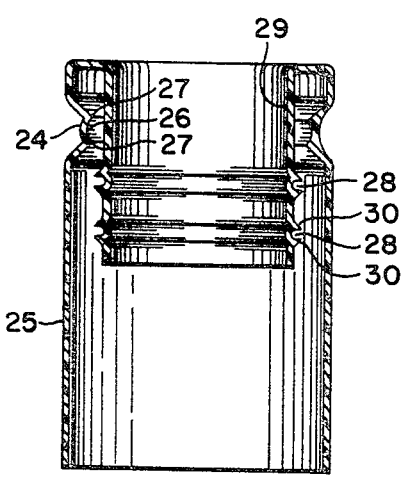
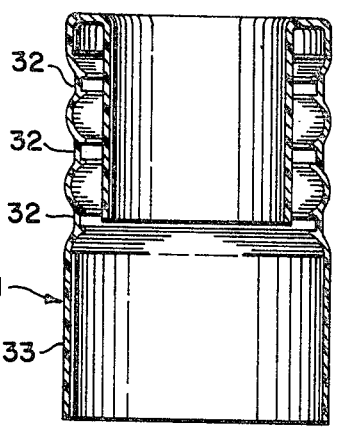
INVENTOR
DAVID E. KIFER
BY Oberlin, Maky & Donnelly
ATTORNEYS

United States Patent Office 3,436,880
Patented Apr. 8, 1969

3,436,880
COUNTER FLASHING
David E. Kifer, Parma, Ohio, assignor to Oatey Co., Cleveland, Ohio, a corporation of Ohio
Filed Feb. 21, 1967, Ser. No. 617,527
Int. Cl. E04d 13/04, 1/36; F16l 57/00
U.S. Cl. 52—58
14 Claims

ABSTRACT OF THE DISCLOSURE

A counter flashing of resiliently deformable material for capping pipes having inner and outer sleeve portions telescoped one within the other and connected together at one end, with resilient gripping surfaces on one or both of the sleeve portions which engage the pipe walls to provide resistance to pull-off.

---

The present invention relates generally as indicated to a counter flashing and, more particularly, to certain improvements in counter flashings for providing a fluid-tight, weather-proof joint between an upstanding soil pipe or the like and the roof or other surface through which the pipe protrudes.

The problem of sealing openings around soil and other such pipes to prevent moisture from entering residential and commercial buildings is, of course, not new. A great many different types of seals have been developed most of which seem to do an adequate job for a time. However, it isn't long before the seals may start to crack or pull away from the pipe which may be due to settling or tilting of the roof or deterioration of the seal material by the weather, resulting in a leaky roof. Many seals are also quite expensive and must be caulked after the roofing is in place, thus necessitating a return trip by the plumber at additional expense.

It is accordingly a primary object of this invention to provide a novel counter flashing which substantially alleviates all of the above enumerated problems. In general, this is accomplished by providing a counter flashing with outer and inner sleeve portions telescoped one within the other and connected together at one end by a flange portion to form a cover or cap for the upper end of the pipe which overlies the opening surrounding the same. The counter flashing is made of a resilient material, whereby the inner sleeve portion may be pulled out of the outer sleeve portion for ease of insertion of the outer sleeve portion over the pipe, after which the inner sleeve portion may be readily shoved into the pipe opening to complete the assembly. Gripping surfaces on one or both of the sleeve portions engage the pipe wall to provide resistance to pull-off.

A further object is to provide such a counter flashing in which the outer sleeve portion is elongated and suitably fashioned at its lower end for connecting directly to the roof or insertion over an existing roof flashing.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In such annexed drawing:

FIG. 1 is a perspective view of a preferred form of counter flashing constructed in accordance with this invention;

FIG. 2 is a central vertical section through the counter flashing of FIG. 1 taken on the plane of the line 2—2 thereof;

FIG. 3 is a central vertical section showing the manner of assembly of the outer sleeve portion of the counter flashing over a collar surrounding the soil pipe with the inner sleeve portion of the counter flashing pulled out to facilitate such assembly;

FIG. 4 is a central vertical section similar to FIG. 3 but with the inner sleeve portion of the counter flashing pushed into position within the open end of the pipe;

FIGS. 5 and 6 are central vertical sections of two other forms of counter flashings in accordance with this invention shown installed over a soil pipe;

FIGS. 7, 9, and 10 are central vertical sections through still other forms of counter flashings; and FIG. 8 is a transverse section through the counter flashing of FIG. 7 taken on the plane of the line 8—8 thereof.

Referring now in detail to the drawing and first especially to FIGS. 1–4, there is shown a preferred embodiment of counter flashing or cap 1 in accordance with this invention which generally consists of an outer sleeve portion 2 having an inner sleeve portion 3 telescopically received therein and connected thereto at one end as by means of a transverse flange portion 4. The entire counter flashing 1 is desirably made of a flexible resilient material such as polyvinyl chloride, and molded in one piece in the configuration shown to permit substantial distortion and flexing of the counter flashing without causing any damage to the same, for a purpose to be explained hereafter.

In a typical installation, the counter flashing 1 may be used in conjunction with a collar 10 to seal the opening around a vent or soil pipe 11 where it projects through the roof. The collar 10 is disposed over the pipe 11 and its lower end connected in suitable manner to the roof, after which the counter flashing 1 is slipped over the upper ends of the collar 10 and pipe 11. For this purpose, it is necessary that the I.D. of the outer sleeve portion 2 be slightly greater than the O.D. of the collar 10, and that the O.D. of the inner sleeve portion 3 be somewhat less than the I.D. of the soil pipe 11 to permit such assembly without having to stretch the counter flashing material.

With the counter flashing 1 in the proper position illustrated in FIG. 4, the space 12 between the exterior of the soil pipe 11 and the interior of the collar 10 is sealed by the counter flashing acting as a boot or cap for the upper ends of the pipe 11 and collar 10 which covers such space. Fluid-tight engagement of the counter flashing 1 with the pipe and collar is not necessary. Thus, even though there might be slight deterioration of the material of the counter flashing 1 by the weather after long use, it will have no effect on the seal whatsoever, as it often does where a tight grip must be maintained. Moreover, because the counter flashing 1 is of a flexible material such as polyvinyl chloride as aforesaid, the counter flashing will fully adapt itself to slight changes in the relative positions of the soil pipe 11 and collar 10 which occurs as the roof settles without causing any damage to the seal.

One or both of the sleeve portions 2, 3 may be provided with gripping surfaces 13, 14 for resiliently gripping the walls of the collar 10 and pipe 11 to provide some resistance to pull-off, or otherwise a strong wind might get under the counter flashing 1 and lift it off. In the counter flashing of the FIGS. 1–4 embodiment, such gripping surfaces consist of annular inwardly and outwardly directed bulges 15 and 16 molded as part of the outer and inner sleeve portions 2 and 3, respectively. Of course, to be effective, these bulges 15, 16 must project sufficiently to engage the adjacent walls of the collar 10 and pipe 11 and be distorted or deformed thereby during assembly, but the amount of deformation necessary to provide resistance to pull-off is slight, thus permitting some latitude in the size of pipes with which a particular sized counter flashing 1 may be used.

As an example, for use with a vent pipe 11 having an I.D. of approximately 3" and a collar 10 surrounding such vent pipe having an O.D. of approximately 3⅝", the inner sleeve portion 3 of the counter flashing 1 may be about 3" long and have an O.D. of about 2¾" with a bulge 16 projecting outwardly therefrom about ¼"; and the outer sleeve portion 2 may be approximately 6" long and have an I.D. of about 4" with a bulge 15 projecting inwardly ¼". Moreover, the bulges 15, 16 are desirably substantially spaced apart from each other with the bulge 15 located below the free end of the inner sleeve portion. However, it should be understood that the location of the bulges 15, 16 and lengths of the inner and outer sleeve portions may vary depending on the relative lengths of the collar 10 and pipe 11. The walls of the inner and outer sleeve portions 3, 2 may be approximately ⅟₁₆" thick to permit ready bending or flexing.

Referring specifically to FIGS. 3 and 4, oftentimes the collar 10 is not perfectly concentrically disposed around the soil pipe 11 or one or both the pipe 11 and collar 10 are out-of-round, whereby the free end of the inner sleeve portion 3 may engage the upper end of the soil pipe 11 when attempting to assemble the counter flashing 1 over the pipe and collar ends, thus making difficult such assembly. With the counter flashing 1 of the present invention, however, this problem may be alleviated by pulling the inner sleeve portion 3 out of the outer sleeve portion 2 as in FIG. 3 prior to sliding the outer sleeve portion 2 over the end of the collar 10 and afterwards pushing or stuffing the inner sleeve portion 3 back into the pipe opening as in FIG. 4. When the inner sleeve portion 3 is pulled out there is substantial distortion in the area of the flange portion 4, but the material is not damaged and is soon returned to its undistorted position where it remains during use.

Although it is preferred that the collar 10 extend slightly above the upper end of the soil pipe 11, it may extend a substantial distance thereabove or even be shorter and the counter flashing 1 will still provide an effective seal, the only limitation being that the outer sleeve portion 2 and inner sleeve portion 3 be long enough to overlie the walls of the collar and soil pipe desirably with one or more of the wall gripping surfaces in proper contact with the collar and/or soil pipe. Of course the location of the wall gripping surfaces along the length of the sleeve portions may be varied as required.

Moreover, if desired the outer sleeve portion 2' may be elongated to extend the full height of the soil pipe 11 above the roof R and provided with a flat end portion 17 for direct connection to the roof as seen in FIG. 5, or the sleeve portion 2" may be provided with a flared end portion 18 for installation over an existing roof flashing 19 as seen in FIG. 6, thereby eliminating the need for an external collar 10 surrounding the soil pipe 11. However, if the collar 10 is not used, the I.D. of the outer sleeve portion should be reduced to permit engagement of its gripping surfaces with the outer wall of the pipe. Moreover, while the end portion 17 is shown disposed at a right angle to the sleeve portion 2' for attachment to a flat roof, it should be understood that the angle may be varied to accommodate any roof angle.

In the embodiment of FIGS. 1–4, only one gripping surfaces 13, 14 is shown on each of the sleeve portions 2, 3, but it should be apparent that a plurality of gripping surfaces may be provided on one or both sleeve portions if desired. The particular means by which the pipe or collar is gripped may take other forms as well. In the embodiment of FIGS. 7 and 8, for example, the outer sleeve portion 20 of the counter flashing 21 has circumferentially spaced, radially inwardly projecting bulges 22, rather than a continuous bulge as in the FIG. 1 embodiment, while the inner sleeve portion 23 is shown completely devoid of pipe gripping surfaces.

In the FIG. 9 counter flashing embodiment, there is an annular inwardly directed bulge 24 on the outer sleeve portion 25 similar to the bulge 15 of the counter flashing 1, but the inner surface 26 thereof is concave and the edges 27 are tapered to create a suction effect when in contact with the collar 10. Plural gripping surfaces 28 on the inner sleeve portion 29 are similarly concave and provided with tapered edges 30 for the same purpose.

In FIG. 10, there is illustrated still another form of counter flashing 31 in which plural gripping surfaces 32 on the outer sleeve portion 33 are channel shaped to provide for suction gripping. Otherwise, the construction and operation of the counter flashings shown in FIGS. 7–10 are substantially identical to the counter flashing 1 of FIGS. 1–4 and accordingly no further discussion of the same is thought to be necessary.

From the above discussion, it can now be seen that the various forms of counter flashings of the present invention are of a simple and unique construction which permits ready installation on any type of vent pipe. The roof flashings act as a cover for the pipes to preclude moisture from entering around the same, and there are no joints to caulk or fluid seals to crack and pull away from the pipes.

Other modes of applying the principles of the invention may be employed, change being made as regards the details described, provided the features stated in any of the following claims or the equivalent of such be employed.

I, therefore, particularly point out and distinctly claim as my invention:

1. A counter flashing for use in capping a pipe and the like to seal an opening in a roof surrounding such pipe comprising an outer sleeve portion, an inner sleeve portion telescopically received within said outer sleeve portion and connected thereto at one end by a flange portion, the outer diameter of said inner sleeve portion being less than the inner diameter of said outer sleeve portion to provide a space therebetween for receipt of the upper end of such pipe, and resiliently deformable gripping means on one of said sleeve portions for resiliently gripping a wall of such pipe to provide resistance to pull-off, said resiliently deformable gripping means being sufficiently deformable to accommodate more than one size of pipe and still maintain the desired resilient grip without deformation of said inner and outer sleeve portions.

2. The counter flashing of claim 1 wherein there are a plurality of said pipe gripping means on said sleeve portion.

3. The counter flashing of claim 1 wherein said gripping means comprises an annular bulge which is resiliently deformed by such pipe when said counter flashing is in position over the end thereof.

4. The counter flashing of claim 3 wherein said bulge is provided with a concave surface for establishing a suction grip with such pipe.

5. The counter flashing of claim 3 wherein said bulge is provided with a channel-shaped surface for establishing a suction grip with such pipe.

6. The counter flashing of claim 1 wherein said inner sleeve portion is of a resiliently deformable material to permit pulling of said inner sleeve portion out of said outer sleeve portion prior to insertion of said outer sleeve portion over the upper end of such pipe and subsequent stuffing of said inner sleeve portion back into the open end of such pipe.

7. The counter flashing of claim 1 wherein the entire counter flashing is of a molded resiliently deformable material to permit substantial distortion of said sleeve portions without damaging the same.

8. In combination, a pipe protruding through an opening in a roof and a counter flashing of resiliently deformable material inserted over the upper end of such pipe, said counter flashing comprising an outer sleeve portion surrounding the outer wall of said pipe adjacent said upper end, an inner sleeve portion telescopically received within the pipe opening and covering the inner wall of said pipe adjacent said upper end, a transverse end portion interconnecting said inner and outer sleeve portions outwardly of said upper end covering said upper end, and resiliently deformable gripping means on one of said sleeve portions for resiliently gripping one of said pipe wall to provide resistance to pull-off, said resiliently deformable gripping means being sufficiently deformable to accommodate more than one size of pipe and still maintain the desired resilient grip without deformation of said inner and outer sleeve portions.

9. The combination of claim 8 further comprising a collar surrounding said pipe with said outer sleeve portion inserted over said collar adjacent the upper end thereof, said gripping means resiliently engaging a wall of one of said collar and pipe.

10. The combination of claim 9 further comprising resiliently deformable gripping means on both of said inner and outer sleeve portions for resiliently gripping a wall of said collar and pipe, said inner sleeve portion being substantially shorter than said outer sleeve portion, and said resiliently deformable gripping means on said outer sleeve portion being located axially beyond the free end of said inner sleeve portion.

11. The combination of claim 8 wherein said outer sleeve portion extends substantially the full height of said pipe above the roof, and means are provided on the lower end of said outer sleeve portion for direct connection of said counter flashing to said roof.

12. The combination of claim 8 further comprising a flashing surrounding said pipe, said outer sleeve portion being sufficiently long to cover the exposed portion of said pipe above said flashing, and means on the lower end of said outer sleeve portion for covering the upper end of said flashing.

13. In combination, a vertically extending pipe projecting through an opening in a roof and a counter flashing covering the upper end of said pipe, said counter flashing comprising inner and outer sleeve portions of resiliently deformable material covering the outer and inner walls of said pipe, respectively, adjacent said upper end, a resiliently deformable intermediate portion interconnecting said inner and outer sleeve portions outwardly of said pipe to cover the upper end thereof, and means integral with said counter flashing for resiliently retaining said counter flashing on said pipe to provide resistance to pull-off.

14. A cap of resiliently deformable material for the upper end of a vent pipe and the like comprising inner and outer sleeve portions connected together at one end by a flange portion, said cap in its undistorted condition having said inner sleeve portion telescoped completely within said outer sleeve portion, said cap being sufficiently distortable to permit said inner sleeve portion to be pulled out of said outer sleeve portion prior to insertion of said outer sleeve portion over such pipe end and subsequent stuffing of said inner sleeve portion completely back to its undistorted condition in the open end of such pipe and gripping means on said cap for gripping such pipe to provide resistance to pull off.

References Cited

UNITED STATES PATENTS

| | | | |
|---|---|---|---|
| 580,515 | 4/1897 | Weeden | 52—58 X |
| 1,244,750 | 10/1917 | McCaffrey | 285—43 |
| 1,279,572 | 9/1918 | Moore | 285—44 |
| 1,421,628 | 7/1922 | Watkins | 220—65 |
| 2,728,356 | 12/1955 | Brinsmade et al. | 138—121 |
| 2,907,351 | 10/1959 | Rohrback et al. | 285—45 X |
| 2,920,908 | 1/1960 | Mitchell | 285—229 X |
| 2,985,465 | 5/1961 | Church | 285—42 |

FOREIGN PATENTS

| | | |
|---|---|---|
| 990,912 | 5/1965 | Great Britain. |
| 247,518 | 12/1947 | Switzerland. |

FRANK L. ABBOTT, *Primary Examiner.*

P. C. FAW, JR., *Assistant Examiner.*

U.S. Cl. X.R.

52—219; 138—96; 285—42